United States Patent
Carstensen et al.

(10) Patent No.: US 8,659,439 B2
(45) Date of Patent: Feb. 25, 2014

(54) SIGNAL DEVICE FOR OFFSHORE WIND FARM

(75) Inventors: Lorenz-Heinrich Carstensen, Haselund (DE); Jens Altemark, Rendsburg (DE)

(73) Assignee: REpower Systems SE, Hamburg (DE)

( * ) Notice: Subject to any disclaimer, the term of this patent is extended or adjusted under 35 U.S.C. 154(b) by 349 days.

(21) Appl. No.: 12/469,497

(22) Filed: May 20, 2009

(65) Prior Publication Data

US 2009/0289804 A1 Nov. 26, 2009

(30) Foreign Application Priority Data

May 20, 2008 (DE) .......................... 10 2008 024 380

(51) Int. Cl.
*G01W 1/00* (2006.01)
(52) U.S. Cl.
USPC .......................... 340/601; 340/907; 340/384.1
(58) Field of Classification Search
USPC .................. 340/985, 851, 984, 601; 342/385; 367/117, 124, 133; 116/24; 73/178 R; 381/104
See application file for complete search history.

(56) References Cited

U.S. PATENT DOCUMENTS

| | | | | |
|---|---|---|---|---|
| 3,475,619 A * | 10/1969 | Campbell | ........................ | 307/40 |
| 3,787,867 A * | 1/1974 | Dodge et al. | .................. | 340/985 |
| 4,007,437 A * | 2/1977 | Widener | ........................ | 367/138 |
| 4,024,491 A * | 5/1977 | Pellerin et al. | ................. | 367/133 |
| 4,042,904 A * | 8/1977 | Cobb | ............................... | 367/117 |
| 4,595,978 A * | 6/1986 | Sheffield | ........................ | 700/12 |
| 6,972,697 B2 * | 12/2005 | Vogel et al. | .................... | 340/984 |
| 7,337,726 B2 * | 3/2008 | Wobben | ........................ | 104/112 |
| 7,355,522 B2 * | 4/2008 | Wobben | .................... | 340/815.45 |
| 2004/0056779 A1 * | 3/2004 | Rast | ............................... | 340/985 |
| 2005/0063555 A1 * | 3/2005 | Berardi et al. | ................ | 381/104 |
| 2005/0270181 A1 | 12/2005 | Wobben | | |
| 2010/0194603 A1 | 8/2010 | Wobben | | |

FOREIGN PATENT DOCUMENTS

| | | |
|---|---|---|
| DE | 102 31 299 | 1/2004 |
| GB | 2205676 A * | 12/1988 |
| WO | WO-2004/012182 | 2/2004 |
| WO | WO-2007/093570 | 8/2007 |

\* cited by examiner

*Primary Examiner* — Kerri McNally
(74) *Attorney, Agent, or Firm* — Morrison & Foerster LLP

(57) ABSTRACT

An offshore wind farm can include at least two wind energy installations for generating electrical power from wind, at least two acoustic warning devices, and a visibility measuring device for detecting visibility. After detection of a visibility below a visibility limit value, an activation signal can be applied to the at least two acoustic warning devices. One or more synchronization modules can be provided which determine the points in time of the acoustic signals to be emitted by at least one of the acoustic warning devices in relation to the acoustic signals of the other acoustic warning devices. Accordingly, this facilitates the navigation along an offshore wind farm and enables safe circumnavigation. Also, the impression of a contiguous area can be conveyed to the ships by the synchronized emission of the warning signals.

15 Claims, 2 Drawing Sheets

SIGNAL DEVICE FOR OFFSHORE WIND FARM

REFERENCE TO RELATED APPLICATIONS

This application claims the priority of German Patent Application No. 10 2008 024 380.9, filed May 20, 2008, the contents of which are incorporated herein by reference.

FIELD OF THE INVENTION

The invention relates to an offshore wind farm comprising a plurality of wind energy installations for generating electrical power from wind, wherein more than one wind energy installation comprises an acoustic warning device in each case, and to a method for controlling the acoustic warning devices.

BACKGROUND OF THE INVENTION

An offshore wind farm is a spatially contiguous area in which wind energy installations are established in the sea. They are often situated in the vicinity of shipping routes and can be reached by general shipping traffic. In this case, the ships are exposed to the risk of collision with the offshore wind farms as a result of incorrect navigation. This risk is taken into consideration by equipping individual wind energy installations with position lights, radar reflectors and radio beacons. In order to be able to give warning indications to the ships in the vicinity of the offshore wind farm even when visibility is poor, a foghorn can also be required in the wind farm (see IALA recommendation 0-117 "On the Marking of Offshore Wind Farms").

In this case, however, offshore wind farms in some instances encompass a great spatial expanse, such that an individual foghorn gives only limited orientation assistance to the traffic participants at sea when visibility is poor, and the regions and directions of movement to be avoided can be poorly determined by the seafarer.

SUMMARY OF THE INVENTION

The object of the invention is to improve the acoustic hazard marking of an offshore wind farm.

According to the invention, in the case of an offshore wind farm comprising at least two wind energy installations for generating electrical power from wind, at least two acoustic warning devices and a visibility measuring device for detecting visibility, it is provided that, after detection of a visibility below a visibility limit value by the visibility measuring device, an activation signal is applied to the at least two acoustic warning devices, and at least one synchronization module is furthermore provided which determines the points in time of the acoustic signals to be emitted by at least one of the at least two acoustic warning devices in relation to the acoustic signals of at least one further acoustic warning device.

The invention has recognized that for better orientation of the ships on the basis of acoustic warning signals, the emission of the signals should take place in a synchronized manner. Firstly, this facilitates the navigation along an offshore wind farm and enables safe circumnavigation; secondly, the impression of a contiguous area is conveyed to the ships by the synchronized emission of the warning signal.

The starting point for the invention is that with uncoordinated signal emission in the wind farm, particularly in the case of relatively large wind farms with relatively large distances between the wind energy installations, the impression of completely separate units between which there is still enough space remaining for the navigation of a ship can easily arise. Since usually only the wind energy installations of an offshore wind farm which are situated at the edge of the farm are equipped with warning devices, the ship can thus maneuver into the wind farm and thus has a particularly high risk of collision with the wind energy installations.

A synchronized emission of the warning signals a clear association of the emitting wind energy installations, such that the navigating ship can recognize that the region situated between the signal sources likewise lies in the hazard region. In this case, synchronized emission should be understood to mean any ordered sequence of signals in which the emission of the signals takes place either at the same time or in such a way that the signals can be temporally distinguished from one another. To give a few examples: synchronized emission is understood to mean simultaneous signal emission or emission that is sequential in a targeted manner. Synchronized signal emission is equally also understood to mean, however, mixed forms in which groups that emit signals simultaneously are formed, wherein the groups emit signals sequentially in a targeted manner with respect to one another.

In one development the acoustic warning devices each comprise a signal module, in which the type, order and/or pitch of the acoustic signal is stored, wherein the signals preferably differ from one another. This can be the pitch, for example, with the result that even when signals are heard simultaneously, it becomes clear that more than one acoustic signal is involved.

In a further development of the invention it is provided that the at least two acoustic warning devices each comprise a volume module, by means of which the volume of the acoustic signals can be set. As a result, the volume of the emitted signal becomes able to be set externally and can be set in a situation-dependent manner, for example by the controller of the wind farm or of the wind energy installation.

In this case, the method can be preferably employed if the synchronization module can be set in such a way that the emission of the presettable sequence of the acoustic signals of the wind energy installations that are emitted by the acoustic warning devices is effected simultaneously or alternatively is coordinated with one another in such a way that the signals do not overlap temporally. The effect of the association is intensified by such synchronization simultaneously or alternately, since the relationship of the signals with respect to one another is evident.

It is furthermore provided that the meteorological conditions influence the volume of the signals emitted by the acoustic warning device. Preferably, the visibility measuring device acts on the volume module in such a way that the volume is all the higher, the lower the measured visibility. In an alternative embodiment it is provided that the offshore wind farm comprises at least one wind determining device for detecting the wind direction and wind strength, in particular as part of at least one wind energy installation, and the wind determining device acts on the volume module of at least one acoustic warning device. It preferably acts in such a way that the signal is emitted all the more loudly, the more strongly the wind blows from a wind direction from which ships most probably come toward the offshore wind farm. As a result, an attenuation of the signal in this direction is at least compensated for. In a further development, the volume of the signal is even increased further beyond pure wind compensation, since such a weather situation signifies a particularly high risk for ships to be driven into the offshore wind farm.

In accordance with one preferred embodiment it is provided that the offshore wind farm comprises at least one proximity module for detecting the distance and/or the direction of movement of a ship, in particular as part of at least one wind energy installation, and the proximity module acts on the volume module of at least one acoustic warning device. Either the wind farm can itself have an automatic radar system or an AIS receiver (automatic ship identification system) in order to detect ship positions and to identify a possible danger and to correspondingly activate the hazard signals. A direction detector module can therefore be provided, which determines the distance, course and/or speed of the ships situated in the vicinity of the offshore wind farm and determines the simultaneous or temporally offset emission and/or volume of the acoustic signals depending on distance, probable approach direction and/or speed of a ship and distances of the acoustic warning devices with respect to one another.

Alternatively, the offshore wind farm, individual wind energy installations or else the maintenance control center can evaluate the data of the automatic ship identification system (AIS) and, in accordance with the risk of collision, determine the collision direction and thereupon increase the volume of the signals emitted in the direction of the collision danger.

In accordance with one advantageous configuration it is provided that the offshore wind farm comprises at least one compensation module for detecting the failure of an acoustic warning device and/or other obstruction markers, in particular as part of at least one wind energy installation, and that the compensation module, after detecting the failure of an acoustic warning device and/or another obstruction marker, acts on the volume module of emitted signals of at least one acoustic warning device. If an acoustic warning device fails, then it is provided that the volume of the closest acoustic warning devices is increased in such a way that the failure is compensated for. In other words for example the compensating acoustic warning devices can be heard two nautical miles from the failed warning device.

In accordance with a further preferred embodiment it is provided that the synchronization module comprises a propagation time module and/or the volume module comprises a distance module, by means of which the signal points in time and/or volume of the acoustic warning devices are set in such a way that the signal is time-synchronous at a predeterminable point outside the offshore wind farm and/or a specific volume is attained. Offshore wind farms are often several kilometers in length, such that the synchronization of the signals to a specific point or a specific direction has to take place taking account of the propagation time differences of the acoustic signal. The acoustic warning device at the furthest distance from the point must also increase its volume to the greatest extent in order still to be readily perceptible. In this case, the point to which the signal emission is synchronized can be variably adjustable or even continuously movable.

In accordance with a further preferred embodiment it is provided that the synchronization module has a receiver module, by means of which the synchronization module receives radio signals from which it derives the points in time for the acoustic signals. In this case, the synchronization is effected by means of the controller of the wind energy installation or the controller of the acoustic warning devices by means of a synchronization of the time measurement in the individual controllers. The controller then derives the points in time of the signal emission from the synchronized time measurement. In this case, the synchronization of the time measurement is effected by means of radio signals, such as, for example, the GPS time signals emitted by global positioning satellites.

In accordance with a further preferred embodiment it is provided that the signals stored in the acoustic warning devices differ from one another. In this case, the signal differs, in particular, not in terms of the sound sequence but rather in terms of the pitch by at least one third.

In accordance with a further preferred embodiment it is provided that the acoustic warning devices comprise a service module, by means of which a data transmission is carried out and the transmission of status messages and data is made possible. In this case, the service module can be embodied as a data interface via which the warning device can communicate with the controller of the wind energy installation, the controller of the offshore wind farm and/or a maintenance control center. It is thereby possible, on the one hand, rapidly to detect the failure of the warning device and to instigate a repair and, on the other hand, if appropriate to make changes to the operating control of the warning device in order for example to change the stored signal.

The invention furthermore relates to a method for controlling a plurality of acoustic warning devices in an offshore wind farm.

BRIEF DESCRIPTION OF THE DRAWINGS

The invention is described by way of example below on the basis of an advantageous embodiment with reference to the accompanying drawings. With regard to all details according to the invention that are not explained more specifically in the text, reference is made expressly to the drawings, in which.

DETAILED DESCRIPTION OF THE INVENTION

Figure 1:
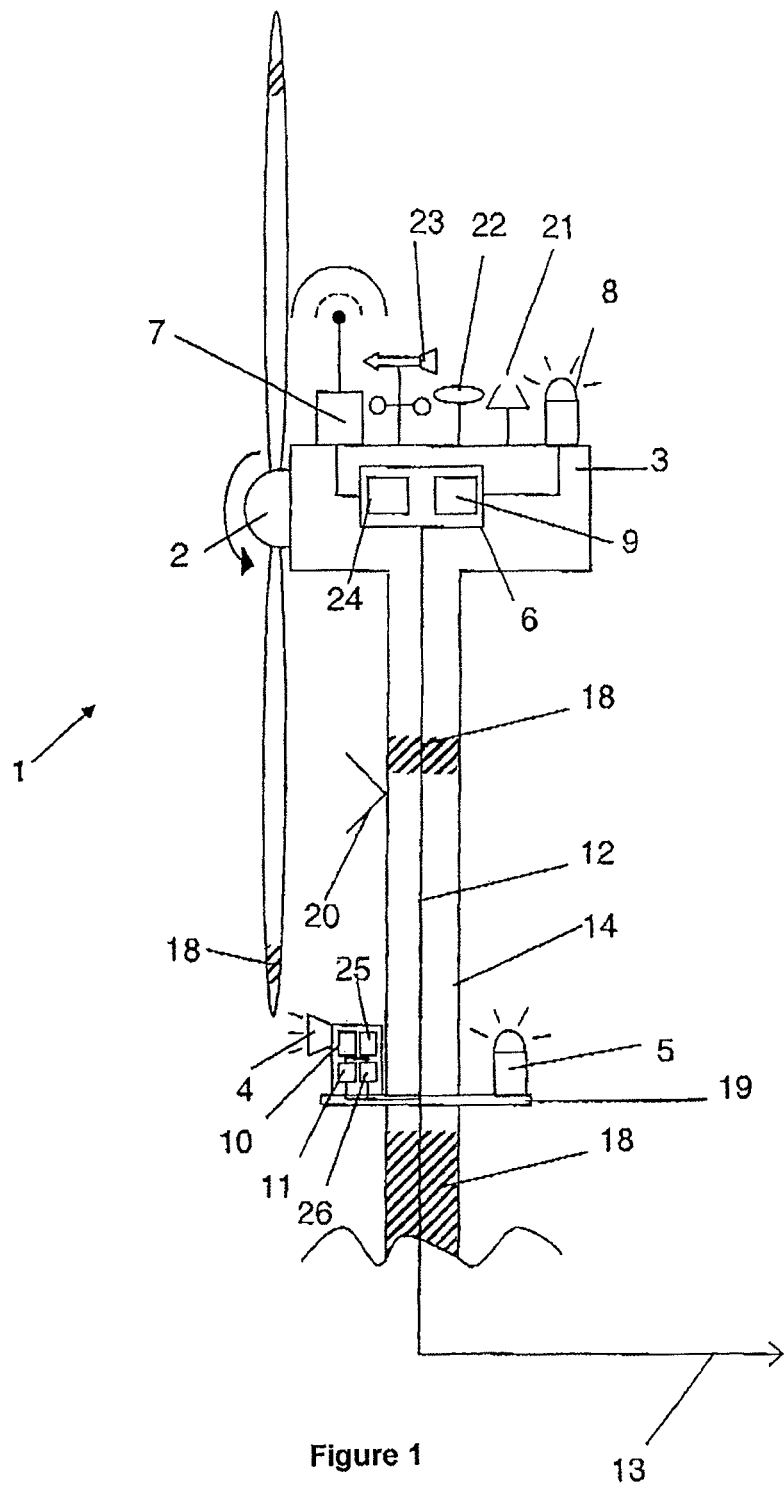
FIG. 1 shows a wind energy installation.

The construction of a wind energy installation 1 for offshore use such as forms the basis of the invention will be explained first. A wind energy installation, designated in its entirety by the reference numeral 1, comprises a rotatable rotor fitted to a nacelle 3 and having rotor blades 2, said rotor being caused to rotate by the wind. For this purpose, the nacelle 3 is fitted on a tower 14 in a pivotable manner. The rotary movement of the rotor having rotor blades 2 is transmitted to an electrical generator (not shown) situated in the nacelle 3, which generator emits the electrical energy generated from the movement to an electrical transmission grid by means of electrical lines (not shown), such that the electrical energy generated can be fed to electrical loads. The offshore wind energy installation 1 is erected in the open sea and is not separated from shipping traffic. Therefore, a particularly high outlay has to be expended in order to reduce the endangering of shipping traffic by collision with the wind energy installation 1. For this purpose, a series of hazard signs 18 and warning devices (4, 5, 7, 8) are fitted to the wind energy installation. The hazard signs and warning devices can comprise the following means:

lights for indication for aircraft 8, which can be fitted on the nacelle 3 and, depending on the height of the tower 14, also on the tower 14, lights for maritime shipping 5, which are fitted 6-30 m above the average high-tide water line for example on the tower 14 or a platform 19, an AIS VHF transmitter and receiver 7 for better location by relatively large ships and by ships, radar reflectors 20 for better reflection of radar locating systems and acoustic warning devices 4, such as e.g. a foghorn for emitting acoustic signals when visibility is poor.

In addition, markings 18 in red or yellow warning color are also fitted to the wind energy installation, in particular on the tower 14, the rotor having rotor blades 2 and/or the nacelle 3.

A visibility measuring device 21 for measuring the visibility and a light meter 22 for measuring the brightness are fitted to the wind energy installation 1. Depending on visibility and external light conditions, the individual warning devices 4, 5, 7, 8 are activated or regulated in terms of their intensity. Under poor light conditions, for example, the illuminance of the lights 5, 8 is increased. If the visibility falls below a preset limit value of e.g. two nautical miles, the acoustic warning device 4 is activated in addition to the lights, said warning device emitting a signal sequence at regular preset intervals. In this case, the signal is stored in a signal module 25 and can be for example a U emitted in Morse code (two short tones followed by one long tone), which is emitted at an interval of 30 seconds.

Some safety components 4, 5, 7, 8 are connected to one another and to the controller 6 of the wind energy installation by means of a data network 12 or field bus system, such as Ethernet, for example. By means of this network data 12, the components communicate their respective measured values, operating states and receive control commands. Furthermore, the data network 12 of the wind energy installation 1 can also have an external data line 13, via which the wind energy installation 1 can be connected directly or indirectly to other wind energy installations in the offshore wind farm 17, a wind farm controller and/or a maintenance control center.

The controller 6 comprises a synchronization module 24, by means of which the points in time at which the acoustic signals of the individual acoustic warning devices are intended to be emitted are determined and communicated to the acoustic warning device 4, which then independently continues the signal sequence and repetition rate stored in the acoustic warning device until a correction of the emission points in time and/or of the repetition frequency is prescribed by the controller 6 or the acoustic warning device 4 is deactivated again.

In an alternative that is not illustrated, the synchronization module 24 can also be arranged in the acoustic warning device itself.

The synchronization module 24 determines the points in time by means of a stored function and the measured time; furthermore, the synchronization module 24 also determines a correction of the emission points in time if this is prescribed by external signals.

In this case, the synchronization module 24 measures the time by means of a time signal receiver 9, via which a time signal is received either via the data network or by a radio signal (e.g. a GPS signal).

The volume of the acoustic warning devices 4 is influenced by the controller 6 of the wind energy installation 1. For this purpose, the acoustic warning device 4 has a volume module 11 having a signal input, via which the volume of the signal emission can be influenced. In this case, the volume in the acoustic warning device 4 is set to a minimum. This minimum can be for example a volume at which, under good conditions, the acoustic warning device is still heard at a distance of two nautical miles (corresponds to approximately 3704 m).

Furthermore, a direction detector module 26 is provided, which, on the basis of the sensor values of the ambient sensors 7, 21, 22, 23 of the wind energy installation, determines the direction in which an increase in volume is particularly expedient and the volume emission at the acoustic warning devices 4 whose main radiating direction lies in this direction performs an increase in volume.

Depending on the situation, the controller 6 of the wind energy installation 1 can increase the volume of the acoustic warning device 4 via the signal input of the volume module 11 or decrease it again to the minimum. The volume is increased whenever the risk of a ship collision is increased. Examples of this include:

The volume is increased step by step, the lower the measured visibility.

The volume of the acoustic warning devices 4 is increased inversely proportionally to the measured wind strength if a wind direction opposite to the main radiating direction of the respective acoustic warning devices is present.

The volume is increased if a ship 27 which undershoots a predeterminable distance from the offshore wind farm 17 is detected by means of the AIS receiver 7.

In addition, the volume can also be increased when one of a plurality of acoustic warning devices 4 fails in the offshore wind farm 17. The increase in volume is effected in such a way that the signal of the failed acoustic warning device 4 is compensated for, that is to say that the range of the signal is for example two nautical miles plus the distance of the acoustic warning devices 4 with respect to one another.

Figure 2:
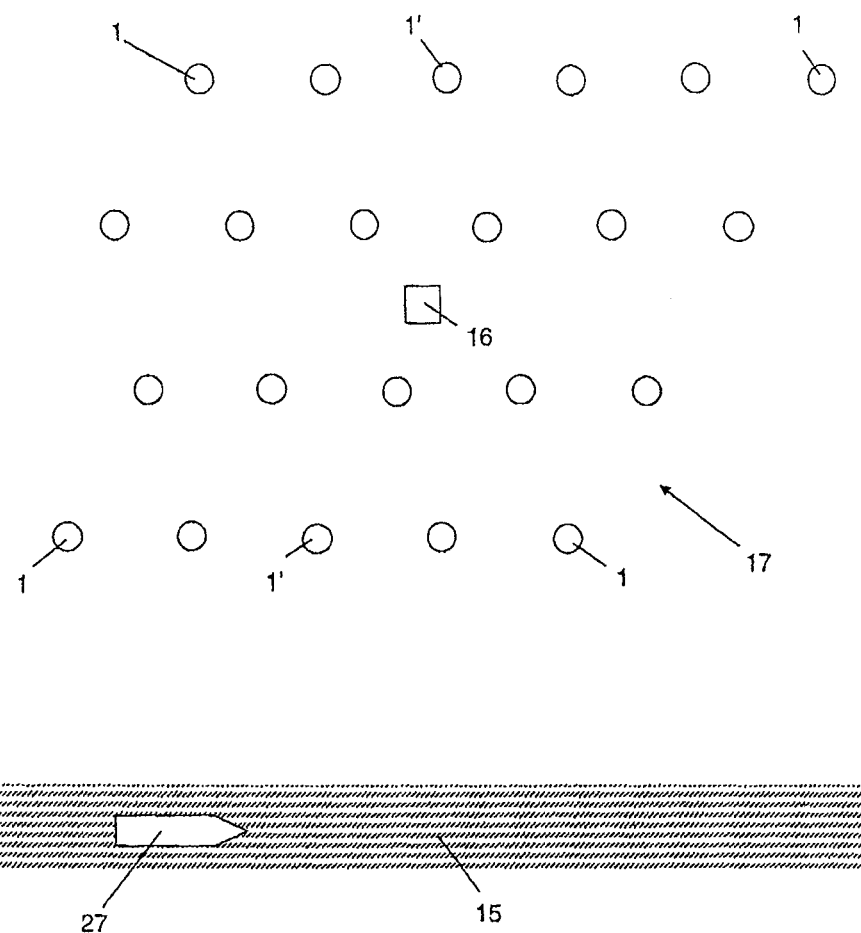
FIG. 2 shows an offshore wind farm.

The synchronization of the acoustic warning devices is clearly illustrated with reference to FIG. 2. FIG. 2 schematically shows an offshore wind farm 17 with a plurality of wind energy installations illustrated symbolically by circles. Some wind energy installations 1, 1' are equipped with the hazard signs 18 and warning devices 4, 5, 7, 8 illustrated in FIG. 1. In particular, these wind energy installations 1, 1' are each equipped with at least one acoustic warning device 4 in order to warn the shipping traffic 27 about an obstruction under conditions of poor visibility. Furthermore, a central platform 16 is also situated in the offshore wind farm, on which platform various service devices are situated, such as e.g. the connection to the power transmission to the mainland, the emergency power supply and, in particular, the wind farm controller that coordinates regulating processes that are superordinate to the individual wind energy installations.

A shipping route 15 leads past in the vicinity of the offshore wind farm 17, on which route the majority of the shipping traffic 27 passes in the vicinity of the offshore wind farm 17.

If the visibility measuring device of a wind energy installation 1, 1' detects a visibility below the visibility limit value, this wind energy installation 1, 1' activates its acoustic warning device and reports the activation to the wind farm controller, which, if appropriate after carrying out a plausibility check of the measured visibilities at the other wind energy installations 1, 1', relays this report to the other wind energy installations 1, 1'. All the acoustic warning devices 4 in the offshore wind farm 17 are thereupon activated and emit the acoustic signals in a synchronized manner.

In the simplest case, the signal emission is effected simultaneously by the acoustic warning devices 4. The emission of the signals in such a way that they do not overlap, that is to say are perceptible as a discreet signal sequence, is significantly more complex. For this purpose, the present emission points in time of the individual acoustic warning devices 4 of the individual wind energy installations 1 are communicated via the external data line 13 in the offshore wind farm 17 to a central wind farm controller 16. The latter determines the optimum signal sequence and transmits corrected emission points in time back to the individual wind energy installations. Alternatively, the function of the central wind farm controller 16 can be performed by an individual wind energy installation 1.

In this case, the synchronization is effected in such a way that the signals are emitted successively, with the result that a passing ship can perceive the signals individually and can therefore estimate its own position relative to the offshore wind farm 17 on the basis of the order and volume of the signals heard.

If an acoustic warning device 4 fails, for example the acoustic warning devices 4 at the peripherally centrally located wind energy installations 1', the failure is reported to the wind farm controller 16, which then relays this failure to the other peripherally laterally situated wind energy installations 1 having acoustic warning devices 4 that still function. These wind energy installations 1 thereupon increase the volume of the acoustic warning devices in such a way that the failure is compensated for.

If a wind energy installation 1, 1' detects, by means of the AIS receiver, that a ship 27 in poor visibility has left the shipping route 15 and is coming nearer and nearer to the offshore wind farm 17, the wind energy installation 1, 1' increases the volume of the acoustic warning device 4. The wind energy installation 1, 1' reports this approach to the wind farm controller 16, which, for its part, increases the volume of the acoustic warning device 4 that is closest to the ship 27.

It is also possible for the volume of a plurality of acoustic warning devices 4 to be increased in such a way that a particularly good perceptibility is achieved at a predetermined point outside the offshore wind farm 17. This means, for example, that in the case where the offshore wind farm 17 illustrated in FIG. 2 is approached from the left-hand or right-hand side, in particular the volume of the acoustic warning devices of the wind energy installations 1 situated at this side is increased.

The invention claimed is:

1. An offshore wind farm comprising:
    at least two wind energy installations configured to generate electrical power from wind;
    at least two acoustic warning devices, wherein the at least two acoustic warning devices each comprise a volume module configured to set the volume of the acoustic signals;
    a visibility measuring device configured to detect visibility, wherein after detection of a visibility below a visibility limit value by the visibility measuring device, an activation signal is applied to the at least two acoustic warning devices;
    a synchronization module configured to determine the points in time of acoustic signals to be emitted by at least one of the acoustic warning devices in relation to acoustic signals of the other or at least one of the other acoustic warning devices; and
    a wind determining device configured to detect wind direction and wind strength, wherein the wind determining device acts on the volume signal applied to the volume module of at least one acoustic warning device.

2. The offshore wind farm of claim 1, wherein the at least two acoustic warning devices each comprise a signal module storing at least one of type, order and pitch of the acoustic signal.

3. The offshore wind farm of claim 1 or 2, wherein, after detection of a visibility below a visibility limit value by the visibility measuring device, a volume signal is applied to each volume module.

4. The offshore wind farm of claim 1 or 2, further comprising:
    a proximity module configured to detect at least one of a distance and a direction of movement of a ship,
    wherein the proximity module acts on the volume signal applied to the volume module of at least one acoustic warning device.

5. The offshore wind farm of claim 1 or 2, wherein the synchronization module comprises a receiver module, by means of which the synchronization module receives radio signals and from the latter it derives the points in time for the acoustic signals.

6. The offshore wind farm of claim 1 or 2, wherein the acoustic warning devices each comprise a service module, by means of which the transmission of status messages and data is made possible.

7. The offshore wind farm of claim 1 or 2, wherein a controller is provided which is configured such as to set the volume at a higher volume the further the predetermined visibility limit value has been undershot.

8. The offshore wind farm of claim 1, wherein the synchronization module is configured such as to coordinate points in time for emitting the signals from the acoustic warning devices with one another in such a way that the signals, taking account of a respective propagation time of each signal, reach a predetermined point outside the offshore wind farm simultaneously.

9. The offshore wind farm of claim 1, wherein a controller is provided which is configured such as to monitor operational readiness of the acoustic warning devices and, in the event of failure of an acoustic warning device, increasing the volume of at least one other acoustic warning device in such a way that the failure is at least partly compensated for.

10. A method for controlling at least two acoustic warning devices in an offshore wind farm comprising at least two wind energy installations for generating electrical power from wind, comprising the steps of:
    measuring visibility in the vicinity of at least one wind energy installation;
    activating the acoustic warning devices in the event of a predetermined visibility limit value being undershot;
    synchronizing signal emission of the acoustic warning devices with respect to one another; and
    setting volume of the acoustic warning devices in a manner dependent on wind direction and wind strength.

11. The method of claim 10, further comprising emitting the signals of the acoustic warning devices at a higher volume the further the predetermined visibility limit value has been undershot.

12. The method of claim 10 or 11, further comprising:
    detecting at least one of position and direction of movement of a ship in the vicinity of the offshore wind farm; and
    altering the volume of the acoustic warning device in a manner dependent on the detected at least one of position and direction of movement.

13. The method of claim 10 or 11, further comprising setting a volume of at least one acoustic warning device in such a way that a predetermined volume is attained at a predetermined point outside the offshore wind farm.

14. The method of claim 10 or 11, further comprising coordinating points in time for emitting the signals from the acoustic warning devices with one another in such a way that the signals, taking account of a respective propagation time of each signal, reach a predetermined point outside the offshore wind farm simultaneously.

15. The method of claim 10 or 11, further comprising monitoring operational readiness of the acoustic warning devices and, in the event of failure of an acoustic warning device, increasing the volume of at least one other acoustic warning device in such a way that the failure is at least partly compensated for.

* * * * *